US007145596B2

(12) United States Patent
Kitaguchi et al.

(10) Patent No.: US 7,145,596 B2
(45) Date of Patent: Dec. 5, 2006

(54) METHOD OF AND APPARATUS FOR COMPOSING A SERIES OF PARTIAL IMAGES INTO ONE IMAGE BASED UPON A CALCULATED AMOUNT OF OVERLAP

(75) Inventors: Takashi Kitaguchi, Kanagawa (JP); Norihiko Murata, Kanagawa (JP); Shin Aoki, Kanagawa (JP); Saburoh Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 502 days.

(21) Appl. No.: 09/893,784

(22) Filed: Jun. 29, 2001

(65) Prior Publication Data
US 2002/0030748 A1    Mar. 14, 2002

(30) Foreign Application Priority Data
Jun. 30, 2000    (JP) .............................. 2000-200198

(51) Int. Cl.
*H04N 5/225* (2006.01)
(52) U.S. Cl. .................... 348/218.1; 348/39; 348/211.1
(58) Field of Classification Search ................ 348/207, 348/211.11, 36, 218.1, 239
See application file for complete search history.

(56) References Cited
U.S. PATENT DOCUMENTS
6,304,284 B1 * 10/2001 Dunton et al. ................ 348/36

6,389,179 B1 * 5/2002 Katayama et al. .......... 382/284
6,512,539 B1 * 1/2003 Dance et al. ................ 348/203
6,657,667 B1 * 12/2003 Anderson .............. 348/333.12

FOREIGN PATENT DOCUMENTS
| JP | 7-107379 | 4/1995 |
| JP | 9-261520 | 10/1997 |
| JP | 11-73494 | 3/1999 |
| JP | 11-98485 | 4/1999 |

* cited by examiner

*Primary Examiner*—David Ometz
*Assistant Examiner*—Gary C. Vieaux
(74) *Attorney, Agent, or Firm*—Oblon, Spivak, McClelland, Maier & Neustadt, P.C.

(57) ABSTRACT

The image input apparatus comprises the image pickup unit which optically scans a subject and successively acquires partial images of the subject. The relative change detection unit detects an amount of relative change in position or speed of the image pickup unit between a time when a previous partial image was taken and a time when a current partial image is being taken. The an overlapping amount calculating unit calculates an amount of overlap between the previous partial image and the current partial image based upon the amount of relative change in position or speed detected by the relative change detection unit. The image recording determination unit determines whether or not the current partial image is to be recorded based upon the amount of overlap calculated by the overlapping amount calculating unit.

20 Claims, 11 Drawing Sheets

| A D | | B E | | E H | | D G |
| --- | --- | --- | --- | --- | --- | --- | --- |
| B E | | C F | | F I | | E H |

IMAGE ACQUIRED BY AREA SENSOR AT TIME t

IMAGE ACQUIRED BY AREA SENSOR AT TIME t+△t

METHOD OF AND APPARATUS FOR COMPOSING A SERIES OF PARTIAL IMAGES INTO ONE IMAGE BASED UPON A CALCULATED AMOUNT OF OVERLAP

FIELD OF THE INVENTION

The present invention relates to image input apparatuses such as digital cameras or non contact type handy scanners and image input method. More particularly, this invention relates to the image input apparatus and image input method which can pick up partial images at such timing that the amount of overlap among the partial images is properly, and then composes the partial images into one image.

BACKGROUND OF THE INVENTION

Recently, in the portable information terminals, there have been ever increasing demands for inputting various documents, especially in the mobile computer environments. These documents vary in a wide range including A 4 size to those sizes wider than this. In an attempt to achieve these demands, conventional flat bed scanners have problems in which it is difficult to carry these and it is also impossible to input the paper face of a document having a large size. In order to solve these problems, for example, Japanese Patent Application Laid-Open No. 11-73494 has proposed the following method. In this method, a scanning process is carried out with the input apparatus made in contact with the document, and the document image is acquired as a plurality of partial images so that these are composed later to reproduce the document image. However, the action (operation) for carrying out the scanning with the apparatus made in contact with the paper face is inferior in operability, resulting in a problem of a long input time.

Recently digital cameras are utilized as portable type scanners. Such a technique has been disclosed by, for example, Japanese Patent Application Laid-Open No. 11-98485. In this method, an input apparatus is placed on the document side, and the input apparatus is allowed to pick up an image of the document, and a distortion due to the image pickup operation, in particular, in a diagonal direction is eliminated. However, problems with this image input apparatus disclosed by this Patent Publication are that the resolution in the input image tends to become insufficient as a whole and that the resolution tends to vary depending on portions thereof located in front the input apparatus and those portions located apart from the input apparatus.

Along with the development of digital image pickup apparatuses with high resolution, the number of pixels in a CCD image pickup element has been remarkably improved; however, these are still insufficient in picking up fine characters and patterns with good reproducibility. Therefore, a process has been proposed in which each portion of an image pickup subject is picked up as a partial image, and these partial images are composed so that an image that looks as if it were taken by using an image pickup element having pixels with high density, with a wide angle. When an image with high precision is generated by using this composing technique of these partial images, the following points need to be taken into consideration.

More specifically, each of the partial images requires an overlapping area with respect to the adjacent partial image. The composing process for the respective partial images is carried out based upon image information on this overlapping area. In general, the greater the overlapping area, the higher the precision in the image composing process. However, on the other hand, there is an increase in the number of partial images to be picked up, and consequently, an increased processing time in the image composing process.

In this manner, when these partial images are picked up, it is necessary to pick up images so as to maintain overlapping areas with a proper number of images. However, such an operation imposes considerable skills and errors on the photographer's side. In order to solve these problems, for example, Japanese Patent Application Laid-Open No. 7-107379 has proposed "a still image pickup apparatus". In Figures, reference number 1 represents an image pickup section for picking up an image from each portion of an image pickup subject, and for successively outputting the resulting image data, reference number 2 represents a pickup position orientation measuring section for measuring the position and orientation of the image pickup section 1, and for outputting position orientation information, reference number 3 represents an image selection section for finding the range of each image to be picked up on the image pickup subject based upon the image data and the image pickup range information successively sent from the image pickup section 1 as well as based upon the position orientation information sent from the pickup position orientation measuring section 2, and reference number 4 is an inner memory in which image previously picked up are stored.

In this still image pickup apparatus, the input apparatus is held by the hand on a document, and the image pickup face is mechanically shifted so that, at each position, each partial image is automatically picked up by the image pickup face in a manner so as to have overlapping areas. However, it is not possible to input the paper face of large size paper, and it is necessary to take into consideration influences from the hand shaking, with the result that the overlapping areas are taken in an excessive manner.

Japanese Patent Application Laid-Open No. 9-261520 discloses an image input apparatus which can pick up a partial image with a proper amount of overlap being maintained, while a scanning process is carried out over a document by the hand in a non contact manner. As illustrated in FIG. 20, in this arrangement, the position orientation of the input apparatus (pickup section 1) is measured, and based upon measuring information related to the position orientation, the current image pickup range on the document is calculated, and based upon the results of the calculations, the amount of overlap over the previously picked up image is estimated so that it is possible to carry out an image acquiring operation at the time when an appropriate amount of overlap has been obtained during the scanning process. Moreover, in this case, the size of the overlapping area is determined depending on the pattern matching (mutual correlation) between the two images in the input images.

However, the problem with the above mentioned conventional image input apparatus as described in Japanese Patent Application Laid-Open No. 9-261520 is that the orientation angles and positions of the input apparatus with 6 degrees of freedom with respect to a subject need to be detected, with the result that the apparatus becomes bulky and expensive in order to carry out these detections, resulting in an expensive apparatus; therefore, this method is not suitable for a practical use.

Moreover, the size of the overlapping area is determined by using pattern matching from an input image; however, in order to achieve this process, it is necessary to input image at high speeds, with the result that a very expensive image pickup element is required and the apparatus is limited in the usable environments.

SUMMARY OF THE INVENTION

It is an object of this invention to provide a small sized, inexpensive image input apparatus and image input method which can detect a change in picked up images between a partial image previously picked up and a current partial image by using a simple structure, and which can properly maintain the amount of overlap of the partial images required at the time of image composition.

The image input apparatus according to one aspect of the present invention comprises an image pickup unit which optically scans a subject and thereby successively acquires plural images of the subject that are partial images of the subject having overlapping portions, wherein the image pickup unit obtains the partial images by moving in a plane that is parallel to a plane of the subject and without touching the subject; a relative change detection unit which detects an amount of relative change in position or speed of the image pickup unit between a time when a previous partial image was taken and a time when a current partial image is being taken; an overlapping amount calculating unit which calculates an amount of overlap between the previous partial image and the current partial image based upon the amount of relative change in position or speed detected by the relative change detection unit; and an image recording determination unit which determines whether or not the current partial image is to be recorded based upon the amount of overlap calculated by the overlapping amount calculating unit.

The image input apparatus according to another aspect of the present invention comprises an image pickup unit which optically scans a subject and thereby successively acquires plural images of the subject that are partial images of the subject having overlapping portions, wherein the image pickup unit obtains the partial images by moving in a plane that is parallel to a plane of the subject and without touching the subject; an angle detection unit which detects a change in angle of the image pickup unit based upon rotation angular velocities around two axes that are virtually parallel with an optic axis of said image pickup unit and mutually perpendicular to each to other between a time when a previous partial image was taken and a time when a current partial image is being taken; an overlapping amount calculating unit which calculates an amount of overlap between the previous partial image and the current partial image based upon the change in angles detected by the angle detection unit; and an image recording determination unit which determines whether or not the current partial image is to be recorded based upon the amount of overlap calculated by the overlapping amount calculating unit.

The image input apparatus according to still another aspect of the present invention comprises an image pickup unit which optically scans a subject and thereby successively acquires plural images of the subject that are partial images of the subject having overlapping portions, wherein the image pickup unit obtains the partial images by moving in a plane that is parallel to a plane of the subject and without touching the subject; an orientation detection unit which detects an orientation of the image pickup unit based upon rotation angular velocities around two axes that are virtually parallel with an optic axis of said image pickup unit and mutually perpendicular to each to other between a time when a previous partial image was taken and a time when a current partial image is being taken; a relative change detection unit which detects an amount of relative change in position or speed of the image pickup unit between a time when a previous partial image was taken and a time when a current partial image is being taken; an overlapping amount calculating unit which calculates an amount of overlap between the partial images taken at the previous input time and the partial images taken at the current input time based upon the amount of relative change in position or speed detected by the relative change detection unit and the orientation detected by the orientation detection unit; and an image recording determination unit which determines whether or not the current partial image is to be recorded based upon the amount of overlap calculated by the overlapping amount calculating unit.

The image input apparatus according to still another aspect of the present invention comprises an image pickup unit which optically scans a subject and thereby successively acquires plural images of the subject that are partial images of the subject having overlapping portions, wherein the image pickup unit obtains the partial images by moving in a plane that is parallel to a plane of the subject and without touching the subject; a plurality of line sensors each of which detects an amount of shift of the image pickup unit in the horizontal direction and in the vertical direction; an overlapping amount calculating unit which determines an amount of shift from input waveforms of the line sensors between the previous partial image and the current partial image, and calculates an amount of overlap between the previous partial image and the current partial image based upon the amount of shift; and an image recording determination unit which determines whether or not the current partial image is to be recorded based upon the amount of overlap calculated by the overlapping amount calculating unit.

The image input apparatus according to still another aspect of the present invention comprises a first image pickup unit which optically scans a subject and thereby acquires plural images of the subject that are partial images of the subject, wherein said image pickup unit obtains the partial images by moving in a plane that is parallel to a plane of the subject and without touching the subject; a second image pickup unit which continuously picks up the image that is being scanned; an overlapping amount calculating unit which calculates an amount of overlap between the partial images picked up by the first image pickup unit based upon the image picked up by the second image pickup unit; and an image recording determination unit which determines whether or not the current partial image is to be recorded based upon the amount of overlap calculated by the overlapping amount calculating unit.

The image input apparatus according to still another aspect of the present invention comprises an image pickup unit which optically scans a subject and thereby successively acquires plural images of the subject that are partial images of the subject having overlapping portions, wherein the image pickup unit obtains the partial images by moving in a plane that is parallel to a plane of the subject and without touching the subject; a timer which counts time that has elapsed time from when the previous partial image was acquired; and an image recording determination unit which determines whether or not the current partial image is to be recorded based on the time counted by the timer.

Other objects and features of this invention will become apparent from the following description with reference to the accompanying drawings.

DESCRIPTION OF THE PREFERRED EMBODIMENTS

Embodiments of an image input apparatus according to the present invention have been explained below with reference to the accompanying drawings. However, the present invention is not intended to be limited by these embodiments.

Figure 1:
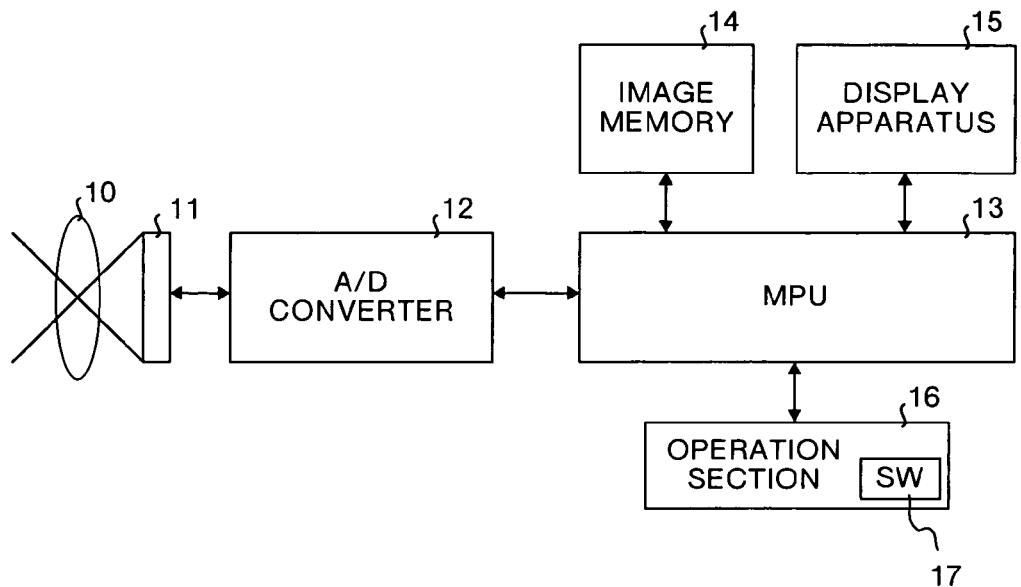
FIG. 1 is a block diagram that shows a basic structure of an image input apparatus in accordance with an embodiment of the present invention.

FIG. 1 is a block diagram that shows a basic structure of an image input apparatus in accordance with the present embodiment. In this Figure, reference number 10 represents a lens for taking a subject image and for converging it on an image pickup element, reference number 11 is an image pickup element, constituted by CCDs, etc., for obtaining an image signal of the subject image that has been converged by the lens 10, reference number 12 is an A/D converter for converting the image signal (analog value) sent from the image pickup element 11 to a digital signal, reference number 13 is an MPU for carrying out various correcting operations and compressing operations on the image signal that has been converted to a digital value by the A/D converter 12, reference number 14 is an image memory for storing the image that has been processed by the MPU 13, reference number 15 represents a display apparatus which is constituted by display panels made from LCD, and which displays images immediately before they are stored and images that have been stored in the image memory 14, reference number 16 is an operation section for carrying out an image pickup operation and for turning the power supply ON/OFF, and reference number 17 is a switch used for picking up an image. Here, in addition to the above mentioned constituent elements, other elements, such as a focusing use distance measuring sensor, a setting mechanism for the zoom magnification and setting mechanisms for various modes, may be installed.

Figure 2:
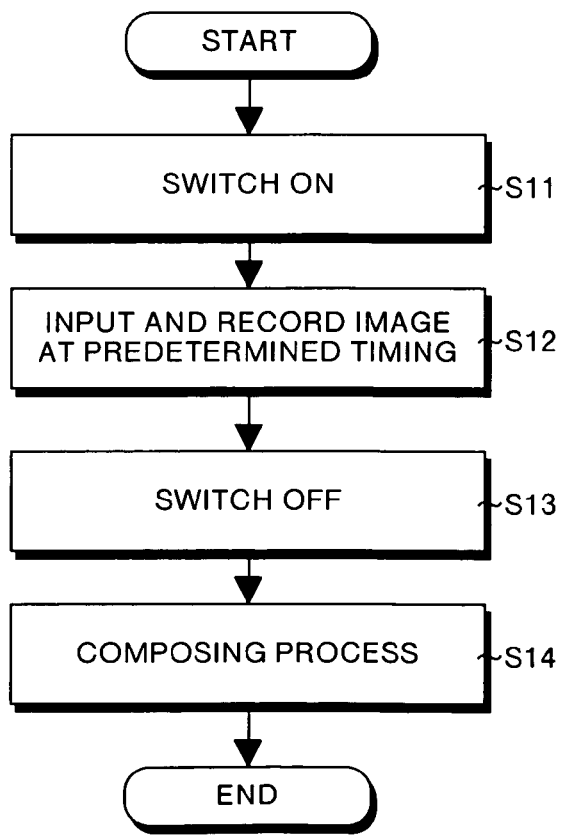
FIG. 2 is a flow chart that shows operations and processes from an image pickup to a composing process.
Figures 3, 4A, 4B, 4C, 4D:
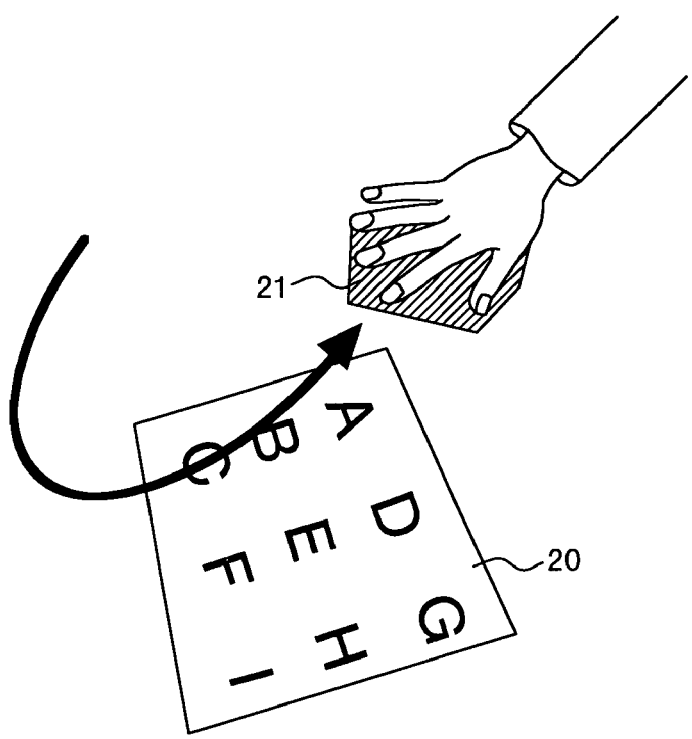
FIG. 3 is an explanatory drawing that shows a state of an image pickup operation by the image input apparatus.
FIG. 4A to FIG. 4D are explanatory drawings that show states of an image to be picked up.

Operation of the image input apparatus will be explained now. FIG. 2 is a flow chart that shows operations and processes from an image pickup process to a composing process. FIG. 3 is an explanatory drawing that shows a state in which the image pickup process is carried out by the image input apparatus. FIG. 4A to FIG. 4D are explanatory drawings that show states of an image to be picked up.

First, as illustrated in FIG. 3, the operator holds the image input apparatus 21 with the hand, turns the switch 17 ON (step S11), and carries out a non contact scanning operation over a subject 20 to be inputted as image information, such as a document, a paper face, and a panel, with the switch 17 being kept ON. During this scanning operation, partial images, which correspond to a plurality of images obtained by dividing the subject image in a predetermined synchronized timing, are picked up (Step S12) Thereafter, the switch 17 is turned OFF (step S13), and a composing operation is carried out (step S14).

In other words, when, for example, images have been picked up in the order of images shown in FIG. 4A to FIG. 4D during the image pickup operation, these images are composed so that the entire image or a required portion of the subject 20 is generated as a sheet of image covering a wide range with high precision in the same manner as the subject 20. Here, this image composing process may be executed in the image input apparatus 21 main body, or the partial images may be transferred to a computer, etc., and the process may be executed in the personal computer. Moreover, the operation method for the image pickup is not intended to be limited by the above embodiment; and, for example, without installing the switch 17, the image pickup operation may be automatically started at the time when the scanning is started.

Figure 5:
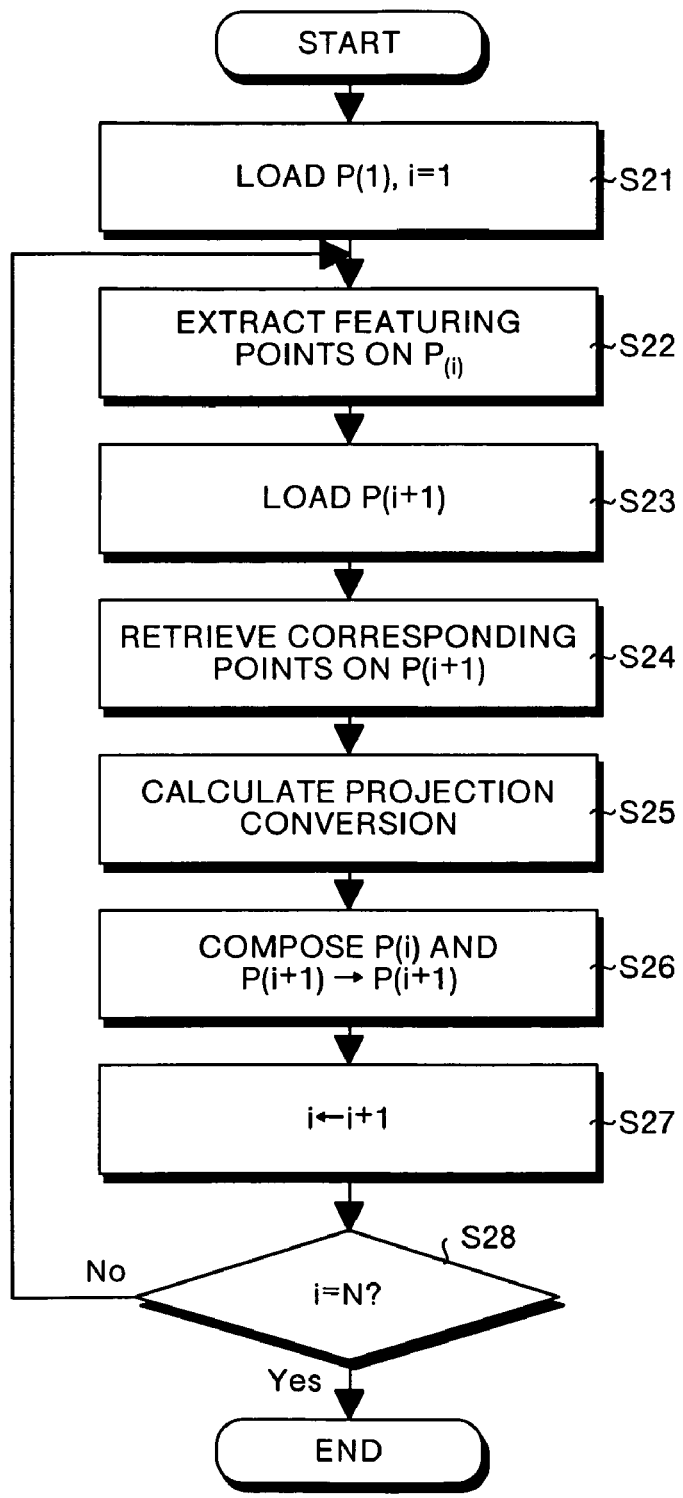
FIG. 5 is a flow chart showing a sequence of composing processes of partial images in accordance with an embodiment of the present invention.
Figure 6A:
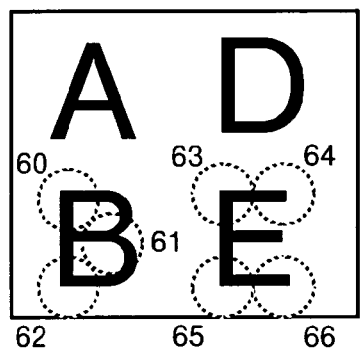
FIG. 6A and FIG. 6B are explanatory drawings that show an example of extracted points corresponding to featuring points of partial images P(1), P(2) and P(1)
Figure 6B:
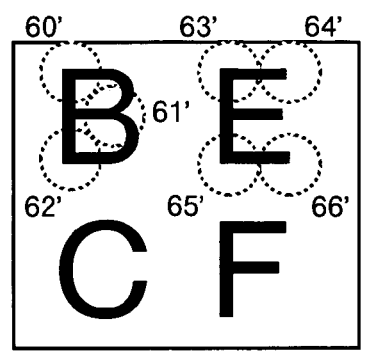

Next, an explanation will be given on the composing method of the partial images. FIG. 5 is a flow chart that shows a sequence of the composing processes of the partial images in accordance with the present embodiment of the invention. FIG. 6A and FIG. 6B are explanatory drawings that show an example of extracting points that correspond to feature points of the partial images P(1), P(2) and P(1).

Here, supposing that each partial image is represented by p(i) (i=1 to N), and that the total number of the partial images is represented by N. First, as illustrated in FIG. 6A, partial image P(1), i=1, is loaded (step S21), and featuring points are automatically extracted from partial image P(1) (step S22). At this time, supposing that partial image P(1) is in a state as shown in FIG. 6A, it is preferable to extract corner portions 60 to 66 as indicated by circled portions as the featuring points. The features of this type may be extracted by using a differential filter, etc.

Successively, partial image P(2), (i+1), adjacent to partial image P(1), is loaded (step S23), and points corresponding to the featuring points P(1) are extracted (step S24). When this partial image P(2) is represented by FIG. 6B, points 60' to 66' corresponding to the featuring points 60 to 66 are extracted. The corresponding point extracting process of this type is carried out by finding correlated values on P(2) within a smaller image area centered on each featuring point on P(1), and the area which makes the correlated values maximum is found so that the center of the area is extracted as a corresponding point.

Successively, a projection conversion parameter, which will be described later, is calculated (step S25), and P(1) and P(2) are composed to one sheet of image (step S26) based upon the featuring points and the corresponding points. The following description will discuss an example of the composing process of these two images.

Here, suppose that coordinates of a point on P(1) are represented by (x, y), and corresponding coordinates on P(2) are represented by (x', y'). When the subject is a plane surface, such as a paper face and a wall, or an object located far away, the following relationship (1) holds.

$$x = \frac{h0 \cdot x' + h1 \cdot y' + h2}{h6 \cdot x' + h7 \cdot y' + 1} \quad (1)$$

$$x = \frac{h3 \cdot x' + h4 \cdot y' + h5}{h6 \cdot x' + h7 \cdot y' + 1}$$

Here, h0 to h7 in equation (1), which are referred to as projection conversion parameters, are inherent constant values between the two images. Therefore, when there are not less than four pairs of a featuring point and a corresponding point, these projection conversion parameters are determined. In general, since an image contains noise, several tens of pairs are used, and the least square method is used to calculate the projection conversion parameters.

After the projection conversion parameters have been calculated in this manner, calculations are carried out by using the above mentioned equation (1) as to which positions on P(1) all the pixels on P(2) are arranged. Thus, P(1) and P(2) are combined into one sheet of image (this is newly referred to as P(1)). The above mentioned calculating processes are repeatedly executed until all the partial images have been composed to form one sheet of image. In other words, i is incremented one by one (step S27), and the same process is carried out until i has reached N (see step S28).

Figure 7A:
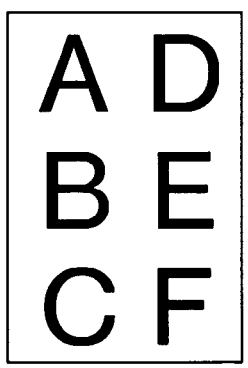
FIG. 7A to FIG. 7C are explanatory drawings that show a sequence of composing processes of the partial images.
Figure 7B:
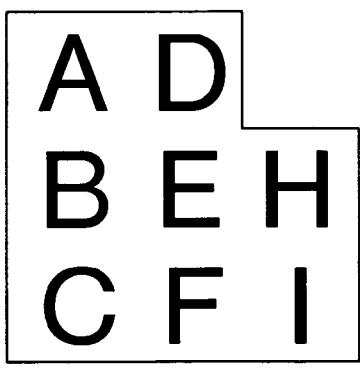
Figure 7C:
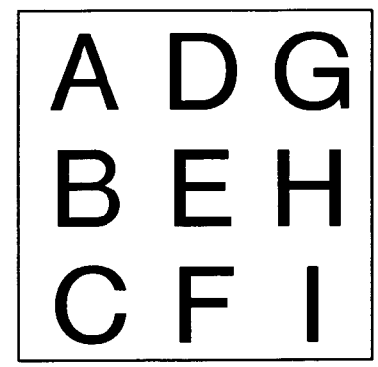

In other words, in case of the partial images shown in FIG. 4A to FIG. 4D, as illustrated in FIG. 7A to FIG. 7C, four images are successively generated, and one sheet of composite image is then generated so that it is possible to generate an image with high precision that covers a wide range.

Next, referring to specific examples, an explanation will be given of the operation and construction of a apparatus for picking partial images up in predetermined synchronized timing, in order to maintain a proper amount of an overlapping area between the partial images.

Figure 8:
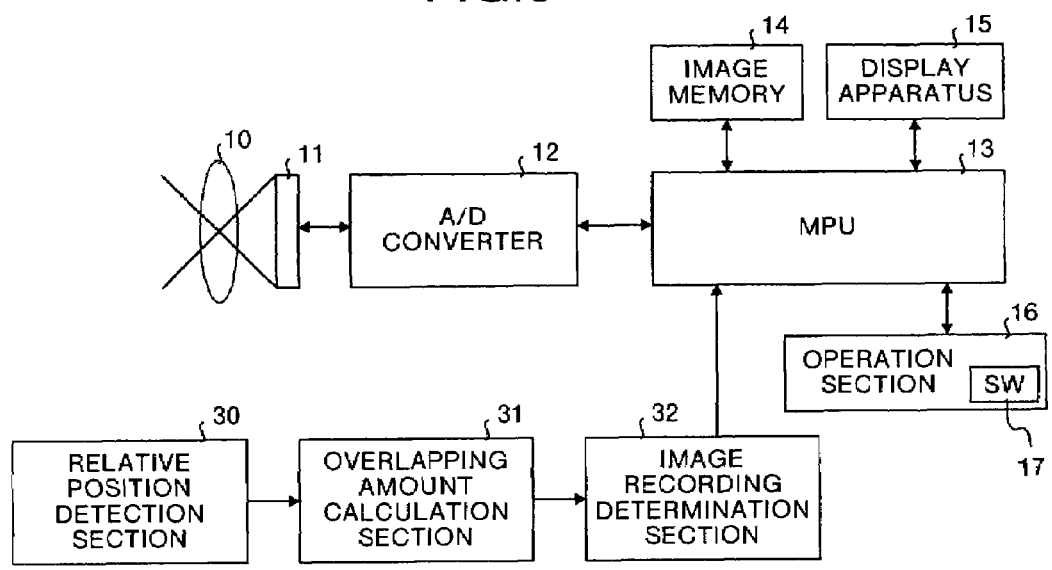
FIG. 8 is a block diagram that shows a construction of an image input apparatus in accordance with a first embodiment of the present invention.

FIG. 8 is a block diagram that shows the construction of an image input apparatus in accordance with the first embodiment of the present invention. In this Figure, reference number 30 represents a relative position detection section for detecting relative positions between a certain period of time in the image input apparatus, reference number 31 represents an overlapping amount calculation section for detecting the amount of overlap (overlapped area) between partial images from the detected value of the relative position detection section 30, and reference number 32 represents an image recording determination section for determining whether or not the current partial image is recordable based upon the amount of overlap calculated by the overlapping amount calculation section 31. Here, the other constituent elements are the same as those shown in FIG. 1; therefore, the same reference numbers are used, and the description thereof is omitted.

The relative position detection section 30 is constituted by, for example, an acceleration sensor for detecting accelerations orthogonal to each other in a direction virtually parallel to an image pickup face and an integral circuit. With respect to the acceleration censor, for example, an inexpensive, small size piezoelectric acceleration censor is used.

In this case, supposing that the time at which a partial image was picked up previously is t, the relative position detection section 30 makes it possible to detect a relative position at the current time t+Δt from the time t. When the relative position is detected from the value of acceleration, integrations are carried out twice; however, an integration constant (initial acceleration) is not determined. Here, since it is supposed that, upon starting an image pickup operation, the acceleration is zero, the calculations are carried out assuming that the integration constant is zero.

Figure 9:
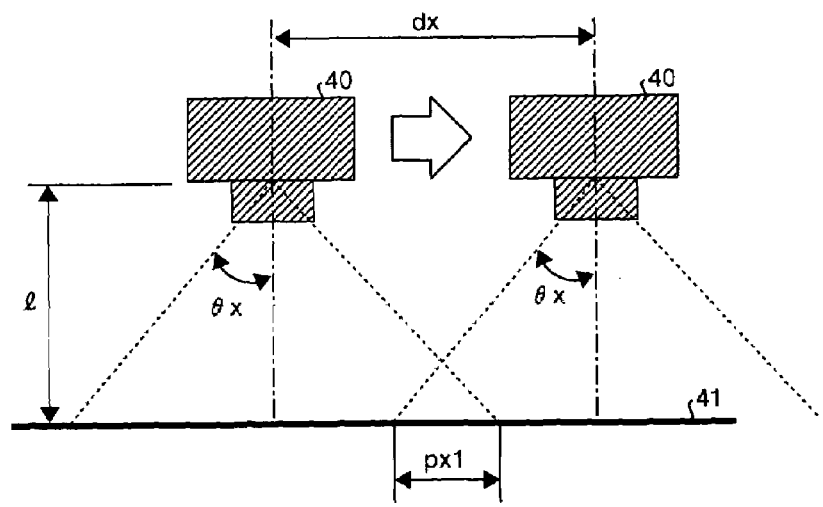
FIG. 9 is an explanatory drawing that shows an example of detection of an amount of overlap in the image input apparatus in accordance with the first embodiment of the present invention.

FIG. 9 is an explanatory drawing that shows an example of the detection of the amount of overlap in the image input apparatus in accordance with the first embodiment of the present invention. In FIG. 9, reference number 40 represents an image input apparatus including the functional elements shown in FIG. 8, and reference number 41 is a surface of a subject.

Suppose that the relative position of the image input apparatus 40 is displaced by dx in the x direction. Moreover, suppose that the image pickup face of the image input apparatus 40 and the face of the subject 41 are in parallel with each other. Furthermore, suppose that the distance from the image input apparatus 40 to the face of the subject 41 is l. It is preferable to set the distance l to the closest value at the time when the operator inputs the subject.

Supposing that the field angle of the image input apparatus 40 in the x direction is 2×θx, the length px1 of an area in which partial images overlap each other is represented by the following equation:

$$px1 = 2l \tan \theta x - dx \quad (2)$$

In the same manner, in the y direction that is orthogonal to the x direction, and parallel to the face of an image, the length py1 of an area in which partial images overlap each other is represented by the following equation:

$$py1 = 2l \tan \theta y - dy \quad (3)$$

Here, it is assumed that the relative displacement of the image input apparatus 40 in the y direction is dy, and that the field angle in the y direction is $2 \times \theta x$. The overlapping amount calculation section 31 carries out calculations of px1 and py1.

Thereafter, px1 and py1, thus calculated, are compared with predetermined threshold values tx and ty in the image recording determination section 32. At this time, when the following inequality is satisfied, an image recording signal is transmitted to MPU 13, and an image pickup operation is carried out:

$$px1 < tx \text{ or } py1 < ty$$

When an image has been picked up, based upon this position as a reference, px1 and py1 are calculated so as to newly pick up the next image adjacent thereto, and a judgment is made as to whether or not the image recording is operable. Additionally, the above mentioned overlapping amount calculation section 31 and the image recording determination section 32 may be realized by software in the MPU 13.

Therefore, in accordance with the first embodiment, the relative position detection section 30 detects at least a directional component in parallel with the image pickup face of a relative position of the image input apparatus; the overlapping amount calculation section 31 calculates the amount of overlap of a partial image that is being currently scanned and is to be inputted by the image input apparatus with respect to at least one partial image that has been inputted before, based upon orientation detection values and shifting velocities; and the image recording determination section 32 determines whether or not the current partial image is recordable based upon the amount of overlap. Thus, in comparison with a conventional arrangement in which positional orientation detections of 6 degrees of freedom are carried out on a subject, it is possible to obtain the amount of overlap required at the time of image composition by using a smaller, inexpensive arrangement.

Figure 10:
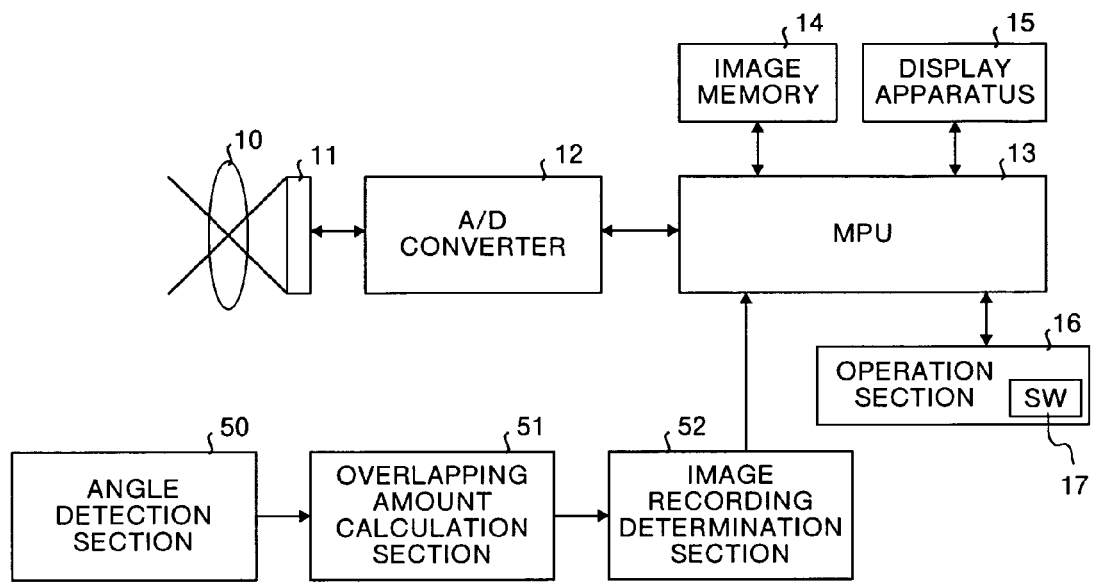
FIG. 10 is a block diagram that shows a construction of an image input apparatus in accordance with a second embodiment of the present invention.

FIG. 10 is a block diagram that shows the construction of an image input apparatus in accordance with the second embodiment of the present invention. In this Figure, reference number 50 represents an angle detection section for detecting a change in angles between a certain period of time in the image input apparatus, reference number 51 represents an overlapping amount calculation section for detecting the amount of overlap (overlapped area) between partial images from the detected value of the angle detection section 50, and reference number 52 represents an image recording determination section for determining whether or not the current partial image is recordable based upon the amount of overlap calculated by the overlapping amount calculation section 51. Here, the other constituent elements are the same as those shown in FIG. 1; therefore, the same reference numbers are used, and the description thereof is omitted.

The angle detection section 50 is constituted by, for example, a gyro sensor for detecting rotation angular velocities around two axes that are orthogonal to each other in a direction virtually parallel to an image pickup face and an integral circuit. With respect to the gyro sensor, for example, a piezoelectric vibration sensor, which detects a movement of an object based upon Coriolis force, converts vibration of a right triangle pole to a vibration torque equal to the number of oscillations of a tuning fork, and obtains a rotation angular velocity as an amount of change in voltage, is used. When the change in angles is detected from the angular velocities, an integration is carried out once. Supposing that the time at which a partial image was picked up previously is t, the angle detection section 50 makes it possible to detect a change in angles at the current time $t + \Delta t$ from the time t.

In addition to this, another arrangement may be used in which an absolute angle is detected by using an acceleration sensor and a magnetic sensor so as to calculate the change in angles. With respect to the magnetic sensor, elements, such as a semiconductor hole element, a semiconductor magnetic resistance element, a magnetic body magnetic resistance element and a magnetic induction type magnetic sensor, may be used.

Figure 11:
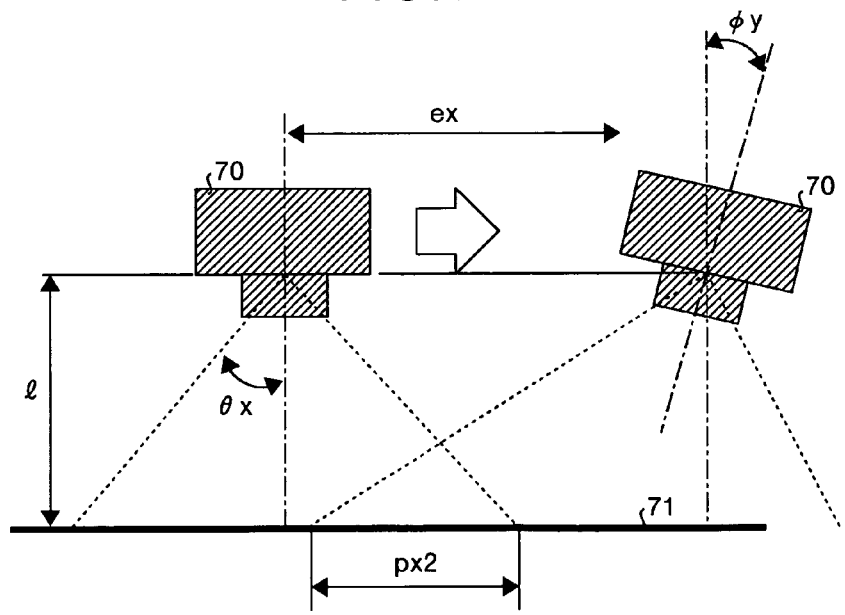
FIG. 11 is an explanatory drawing that shows an example of detection of an amount of overlap in the image input apparatus in accordance with the second embodiment of the present invention.

FIG. 11 is an explanatory drawing that shows an example of the detection of the amount of overlap in the image input apparatus in accordance with the second embodiment of the present invention. In this Figure, reference number 70 represents an image input apparatus arranged as illustrated in FIG. 10, and reference number 71 is a surface of a subject.

Here, suppose that the image input apparatus 70 has an angular change by $\phi y$ around the y axis. Moreover, it is supposed that the x axis and y axis are axes that are in parallel with the image pickup face, and are orthogonal to each other while passing through the optical center of the image input apparatus 70. Furthermore, suppose that the distance from the image input apparatus 70 to the face of the subject 71 is l, and that, in relation to the position of the image input apparatus 70 at the time t, a relative position thereof at the time $t + \Delta t$ is represented by (ex, ey). It is preferable to set the distance l to the closest value at the time when the operator inputs the subject, or (ex, ey) may be set to (0, 0).

Supposing that the field angle of the image input apparatus 70 in the x direction is $2 \times \theta x$, the length px2 in the x direction of an area in which partial images overlap each other is represented by the following equation:

$$px2 = l \tan \theta x + l \tan (\theta x + \phi y) - ex \quad (4)$$

In the same manner, the length py2 of an area in which partial images overlap each other is represented by the following equation:

$$py2 = l \tan \theta y + l \tan(\theta y + \phi x) - ey \quad (5)$$

Here, the field angle in the y direction of the image input apparatus 70 is set to $2 \times \theta y$. Calculations on these px2 and py2 are carried out in the overlapping amount calculation section 51.

Thereafter, px2 and py2, thus calculated, are compared with predetermined threshold values tx and ty in the image recording determination section 52. At this time, when the following inequality is satisfied, an image recording signal is transmitted to MPU 13, and an image pickup operation is carried out:

$$Px2 < tx \text{ or } py2 < ty$$

When an image has been picked up, based upon this position as a reference, px2 and py2 are again calculated so as to newly pick up the next image adjacent thereto, and a judgment is made as to whether or not the image recording is operable. Additionally, the above mentioned overlapping amount calculation section 51 and the image recording determination section 52 may be realized by software in the MPU 13. Moreover, in this embodiment, it is assumed that the image pickup face of the image input apparatus 70 and the face of the subject 71 are in parallel with each other at time t; however, it may be assumed that they are in parallel with each other at the time when the initial partial image P(1) is picked up, and a change in angles may be calculated.

Therefore, in accordance with the second embodiment, the angle detection section 50 detects at least components around the two axes that are orthogonal to the light axis and are virtually orthogonal to each other of the rotation angle of the image input apparatus 70; the overlapping amount calculation section 51 calculates the amount of overlap of a partial image that is being currently scanned and is to be inputted by the image input apparatus 70 with respect to at least one partial image that has been inputted before, based upon the angular velocities; and the image recording determination section 52 determines whether or not the current partial image is recordable based upon the amount of overlap. Thus, even in the case of a great rotation by the user and in the service environments, it is possible for the image input apparatus to obtain the amount of overlap required at the time of image composition by using a smaller, inexpensive arrangement, as compared with a conventional apparatus.

Figure 12:
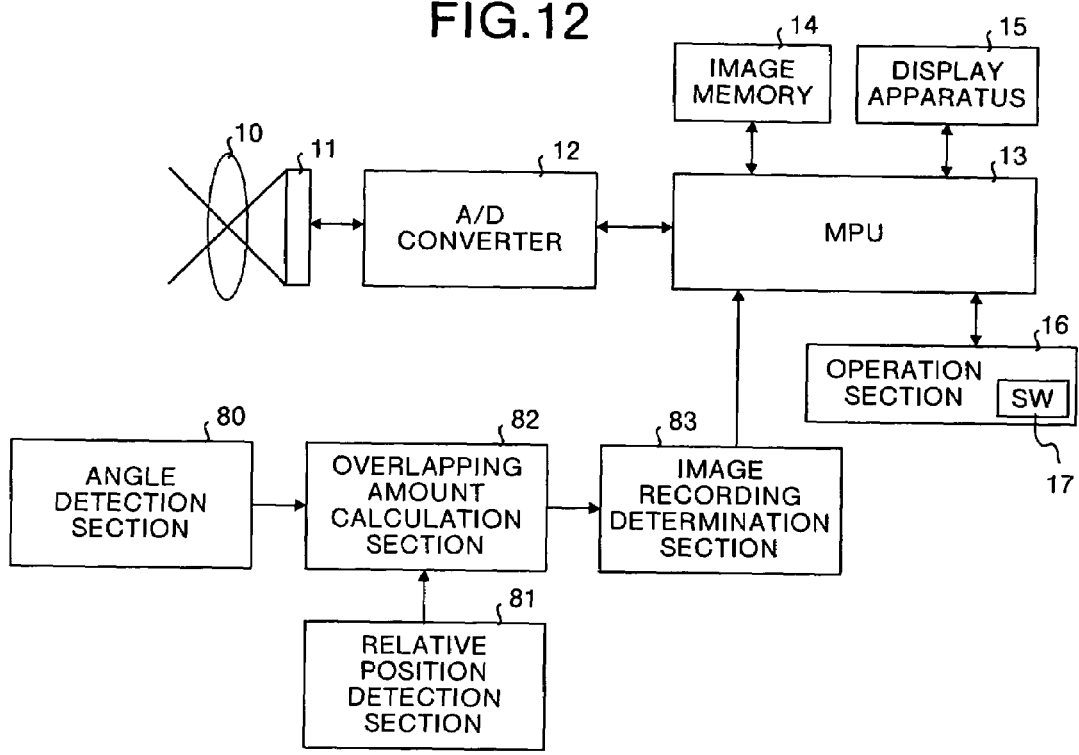
FIG. 12 is a block diagram that shows a construction of an image input apparatus in accordance with a third embodiment of the present invention.

FIG. 12 is a block diagram that shows the construction of an image input apparatus in accordance with the third embodiment of the present invention. In this Figure, reference number 80 represents an angle detection section for detecting a change in orientation angles between a certain period of time in the image input apparatus, reference number 81 represents a relative position detection section for detecting a relative position of the image input apparatus between a certain period of time, reference number 82 represents an overlapping amount calculation section for detecting the amount of overlap (overlapped area) between partial images from the detected value of the angle detection section 80 or the detected value of the relative positional detection section 81, and reference number 83 represents an image recording determination section for determining whether or not the current partial image is recordable based upon the amount of overlap calculated by the overlapping amount calculation section 82. Here, the other constituent elements are the same as those shown in FIG. 1; therefore, the same reference numbers are used, and the description thereof is omitted.

The angle detection section 80 is constituted by, for example, a gyro sensor for detecting rotation angular velocities around two axes that are orthogonal to each other in a direction virtually parallel to an image pickup face, and an integral circuit. When the change in angles is detected from the angular velocities, an integration is carried out once. The relative position detection section 81 is constituted by, for example, an acceleration sensor for detecting accelerations that are orthogonal to each other in a direction virtually parallel to the image pickup face, and an integral circuit.

When the relative position is detected from the value of acceleration, integrations are carried out twice; however, an integration constant (initial acceleration) is not determined. Here, since it is supposed that, upon starting an image pickup operation, the acceleration is zero, the calculations are carried out assuming that the integration constant is zero. Moreover, a gravity component is mixed into the value of acceleration. However, supposing that the acceleration by the scanning upon starting an image pickup operation is 0, the value of acceleration at this time is exerted by gravity.

Here, supposing that time 0 is the starting time of an image pickup operation, the value of the acceleration sensor is represented by the following expression:

$$\begin{bmatrix} gx \\ gy \\ gz \end{bmatrix}$$

Next, the value obtained by the acceleration sensor at the time t is represented by the following expression:

$$\begin{bmatrix} ax \\ ay \\ az \end{bmatrix}$$

The angle detection section 80 makes it possible to detect a change in rotation angles at the time t in relation to the time 0. Supposing that this three axes rotation matrix is represented by R, the direction of gravity at the time t is represented by the following expression:

$$R \begin{bmatrix} gx \\ gy \\ gz \end{bmatrix}$$

Here, the acceleration component by the scanning at the time t is represented by the following expression:

$$\begin{bmatrix} ax \\ ay \\ az \end{bmatrix} - R \begin{bmatrix} gx \\ gy \\ gz \end{bmatrix}$$

Based upon the above mentioned expressions, supposing that the time at which a partial image was picked up previously is t, the relative position and the change in angles at the current time t+Δt in relation to the time t can be detected.

Figure 13:
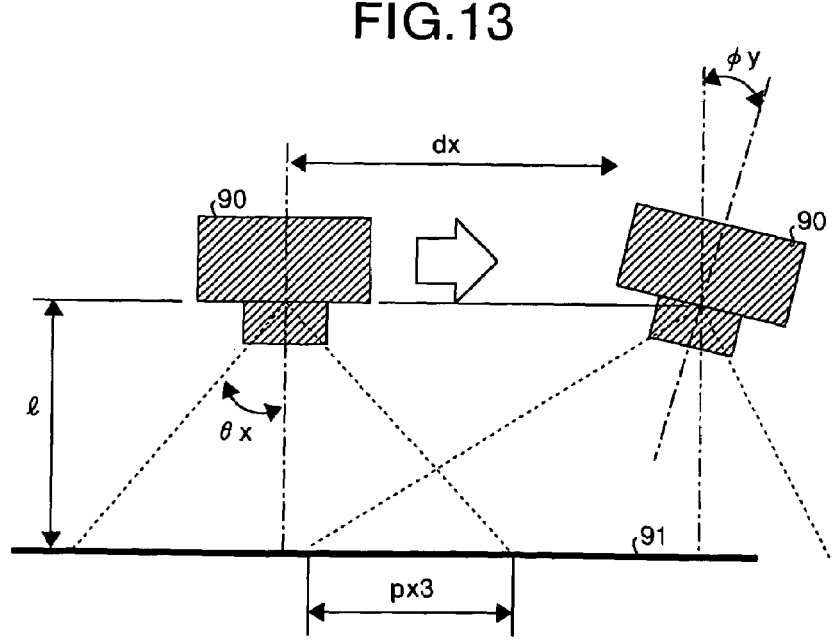
FIG. 13 is an explanatory drawing that shows an example of detection of an amount of overlap in the image input apparatus in accordance with the third embodiment of the present invention.

FIG. 13 is an explanatory drawing that shows an example of the detection of the amount of overlap in the image input apparatus in accordance with the third embodiment of the present invention. In this Figure, reference number 90 represents an image input apparatus arranged as illustrated in FIG. 12, and reference number 91 is a surface of a subject.

Suppose that the image input apparatus 90 has an angular change by φy around the y axis. Moreover, suppose that the relative position of the image input apparatus 90 is represented by (dx, dy, dz). Here, it is supposed that the x axis and y axis are axes that are in parallel with the image pickup face, and are orthogonal to each other while passing through the optical center of the image input apparatus 90. Moreover, it is supposed that at the time t, the image pickup face of the image input apparatus 90 and the face of the subject 91 are in parallel with each other at the time t. Furthermore, suppose that the distance from the image input apparatus 90 to the face of the subject is l. The distance 1 is preferably set to the closest value at the time when the operator inputs the subject.

Supposing that the field angle of the image input apparatus 90 in the x direction is 2×θx, the length px3 in the x direction of an area in which partial images overlap each other is represented by equation (6):

$$px3 = l\tan\theta x + l\tan(\theta x + \phi y) - dx \quad (6)$$

In the same manner, the length py3 of an area in which partial images overlap each other is represented by equation (7):

$$py3 = l\tan\theta y + l\tan(\theta y + \phi x) - dy \quad (7)$$

Here, the field angle in the y direction of the image input apparatus 90 is set to 2×θy. Calculations on these px3 and py3 are carried out in the overlapping amount calculation section 82. Thereafter, px3 and py3, thus calculated, are compared with predetermined threshold values tx and ty in the image recording determination section 83. At this time, when the following in equality is satisfied, an image recording signal is transmitted to MPU 13, and an image pickup operation is carried out:

px3<tx or py3<ty

When an image has been picked up, based upon this position as a reference, px2 and py2 are again calculated so as to newly pick up the next image adjacent thereto, and a judgment is made as to whether or not the image recording is operable. Additionally, the above mentioned overlapping amount calculation section 82 and the image recording determination section 83 may be realized by software in the MPU 13. Moreover, in this embodiment, it is assumed that the image pickup face of the image input apparatus 90 and the face of the subject 91 are in parallel with each other at time t; however, it may be assumed that they are in parallel with each other at the time when the initial partial image P(1) is picked up, and a change in angles may be calculated.

Therefore, in accordance with the third embodiment, the angle detection section 80 detects the orientation of the image input apparatus, the relative position detection section 81 detects the relative position of the image input apparatus so that the overlapping amount calculation section 82 calculates the amount of overlap of a partial image that is being currently scanned and is to be inputted by the image input apparatus with respect to at least one partial image that has been inputted before, based upon the orientation detection and the shifting velocities, and the image recording determination section 83 determines whether or not the current partial image is recordable based upon the amount of overlap. Thus, it is possible to realize a small size apparatus with higher reliability at low costs.

Figure 14:
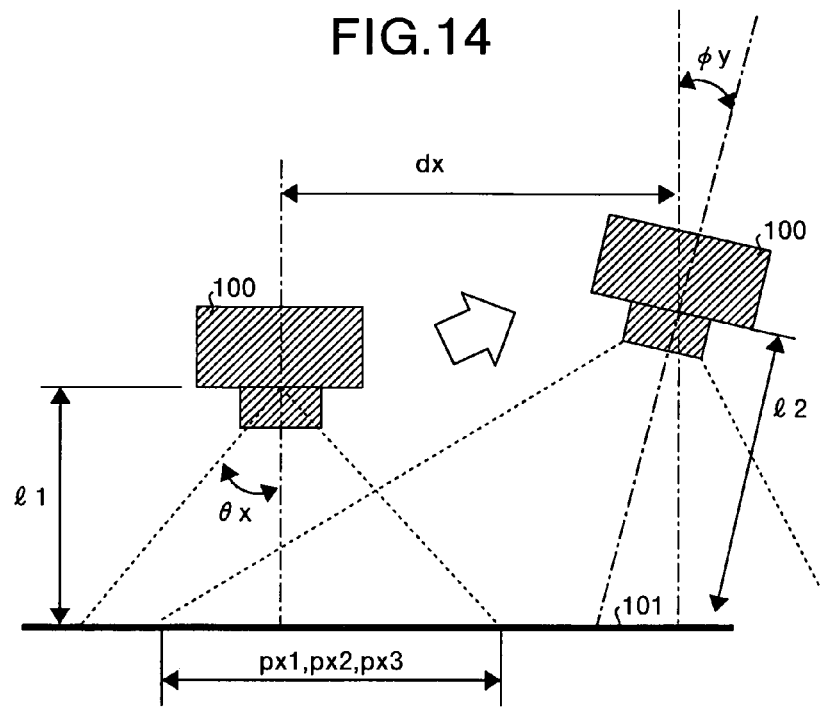
FIG. 14, which relates to a fourth embodiment, is an explanatory drawing that shows an example of detection of an amount of overlap in the image input apparatus having a structure of FIG. 8, 10 or 12 to which a distance measuring sensor is added.

Fourth embodiment is a case in which, in any one of the above mentioned first to third embodiments, a distance measuring sensor for measuring the distance from the subject in the light axis direction of the image input apparatus is installed. In other words, in the arrangement as shown in FIG. 8, FIG. 10 or FIG. 12, a distance measuring sensor is connected to the MPU 13. FIG. 14 is an explanatory drawing that shows an example of the detection of the amount of overlap in an image input apparatus 100 in which a distance measuring sensor 101 is added to the construction of FIG. 8, FIG. 10 or FIG. 12. In this Figure, reference number 100 represents the image input apparatus, reference number 101 is the distance measuring sensor, and reference number 102 is a surface of a subject.

With respect to the distance measuring sensor 101, any one of the ultrasonic wave system, the optical system and the eddy current system may be used. For example, an active system which detects scattered light of an infrared beam so that the distance is calculated by using the triangulation may be used, or a passive system for measuring the distance based upon the focal distance may be used. Alternatively, a function used for auto focusing maybe used as the distance measuring sensor 101 in a combined manner.

As illustrated in FIG. 14, suppose that the image input apparatus 100 is shifted from a position on the left to a position on the right. Suppose that distance information obtained by the distance measuring sensor 101 on the left position is represented by l1, and that distance information obtained by the distance measuring sensor 101 on the right position is represented by l2. In this case, px1, py1, described in the first embodiment, are represented by the following equation (8):

$$px1 = (l1+l2)\tan\theta x - dx$$

$$py1 = (l1+l2)\tan\theta y - dy \quad (8)$$

Moreover, px2, py2, described in the second embodiment are represented by the following equation (9):

$$px2 = l1\tan\theta x + l2\sin(\theta x + \phi y) - ex$$

$$py2 = l1\tan\theta y + l2\sin(\theta y + \phi x) - ey \quad (9)$$

Furthermore, px3, py3, described in the second embodiment, are represented by the following equation (10):

$$px3 = l1\tan\theta x + l2\sin(\theta x + \phi y) - dx$$

$$py3 = l1\tan\theta y + l2\sin(\theta y + \phi x) - dy \quad (10)$$

Therefore, in accordance with the fourth embodiment, since the distance measuring sensor 101 for detecting the distance from the subject is installed in each of the image input apparatuses of Embodiments 1 to 3, the overlapping amount detection section is allowed to detect the amount of overlap between partial images by utilizing the distance information from the distance measuring sensor 101; therefore, it becomes possible to maintain an overlapping area required upon image composition more accurately.

Fifth embodiment is a case in which, in any one of the above mentioned first to fourth embodiments, an inclination of a subject is detected, and this is utilized for the calculations on the amount of overlap. When the inclination of the subject is detected, distance measuring sensors, which measure distances to the subject in at least three directions that are not parallel to each other from the image input apparatus (in FIG. 14, distance measuring sensors 101 are placed in three directions that are not parallel to each other), are installed. In this case, when the distances at least in the three directions are found, normal vectors (a, b, c) of the face of the subject with respect to the image input apparatus can be calculated.

Supposing that axes that are orthogonal to each other in parallel with the face of the subject are x axis and y axis, the inclination of the image input apparatus with respect to the subject, that is, the rotation angles (φx, φy around the x axis and y axis, are found from equation (11):

$$\varphi x = \tan^{-1}\frac{b}{\sqrt{a^2+c^2}} \quad (11)$$

$$\varphi y = \tan^{-1}\frac{a}{b}$$

Based upon the above mentioned equations, equations (8) to (10) are respectively represented by equations (12) to (14):

$$px1 = (l1+l2)\tan(\theta x + \phi y) - dx$$
$$py1 = (l1+l2)\tan(\theta y + \phi x) - dy \quad (12)$$
$$px2 = l1\tan(\theta x + \phi y) + l2\sin(\theta x + \phi y + \phi y) - ex$$
$$py2 = l1\tan(\theta y + \phi x) + l2\sin(\theta y + \phi x + \phi x) - ey \quad (13)$$
$$px3 = l1\tan(\theta x + \phi y) + l2\sin(\theta x + \phi y + \phi y) - dx$$
$$py3 = l1\tan(\theta y + \phi x) + l2\sin(\theta y + \phi x + \phi x) - dy \quad (14)$$

Therefore, in accordance with the fifth embodiment, since, in Embodiments 1 to 3, the distance from the subject is detected so that the overlapping amount detection section calculates the amount of overlap by utilizing this distance, not only information of the position orientation on the image input apparatus side, but also information of the orientation of the subject can be inputted; therefore, it becomes possible to maintain an overlapping area required upon image composition more accurately.

Figure 15:
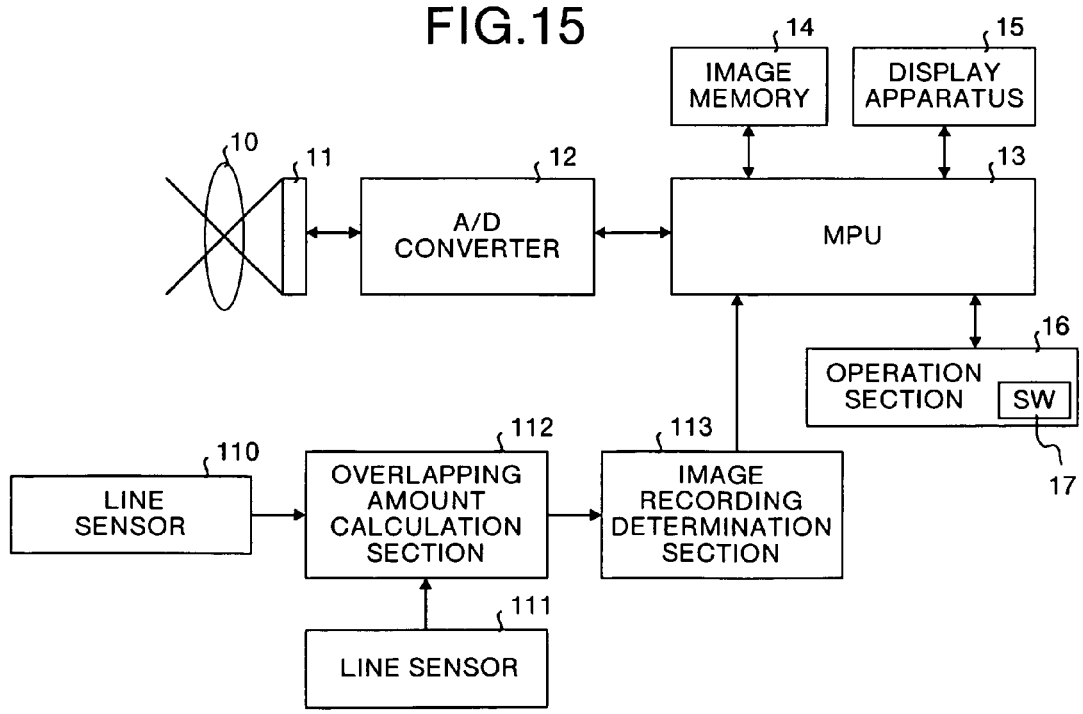
FIG. 15 is a block diagram that shows a construction of an image input apparatus in accordance with the sixth embodiment of the present invention.

FIG. 15 is a block diagram that shows the construction of an image input apparatus in accordance with a sixth embodiment of the present invention. In this Figure, reference number 110 represents a line sensor that measures the amount of shift of the subject in the vertical direction, reference number 111 represents a line sensor that measures the amount of shift of the subject in the horizontal direction, reference number 112 is an overlapping amount calculation section for calculating the amount of overlap between partial images from the output values of the line sensors 110, 111, and reference number 113 is an image recording determination section for determining whether or not the current partial image is recordable based upon the amount of overlap calculated by the overlapping amount calculation section 112. Here, the other constituent elements are the same as those shown in FIG. 1; therefore, the same reference numbers are used, and the description thereof is omitted.

Figure 16:
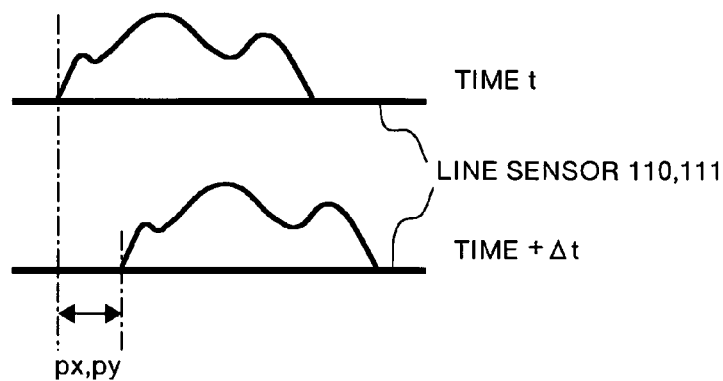
FIG. 16 is an explanatory drawing that shows a detection state at the time t and the time t+Δt in a line sensor in accordance with the sixth embodiment of the present invention.

In this manner, the line sensor 110 and the line sensor 111 are placed in a manner so as to be virtually orthogonal to each other. FIG. 16 is an explanatory drawing that explains the output relationship of the line sensors at the time t and the time t+Δt. Based upon input waveforms of the line sensors 110, 111 at the time t in which a partial image was picked up previously and input waveforms at the current time t+Δt, the overlapping amount calculation section 112 calculates the amount of shift of the partial image. Here, the respective amounts of shifts of the line sensors 110, 111 are represented by px, py. The amounts of shifts are compared with predetermined threshold values tx, ty in the image recording determination section 113.

When the results of the comparison in the image recording determination section 113 satisfy the following inequality, an image recording signal is transmitted to MPU 13, and an image pickup operation of a partial image is carried out:

$$px < tx \text{ or } py < ty$$

When the partial image has been picked up, based upon the respective values of the line sensors 110, 111 at this position as a reference, px and py are again calculated by the overlapping amount calculation section 112 so as to newly pick up the next partial image adjacent thereto, and a judgment is made by the image recording determination section 113 as to whether or not the image recording is operable. Additionally, the above mentioned overlapping amount calculation section 112 and the image recording determination section 113 may be realized by software in the MPU 13.

In this manner, the line sensors 110, 111 that are orthogonal to each other are placed, and the amount of overlap of a partial image that is being currently scanned and is to be inputted by the image input apparatus with respect to at least one partial image that has been inputted before is calculated from the amounts of shifts of the line sensors 110, 111, so as to determine whether or not the current partial image is recordable; therefore, this arrangement makes it possible to eliminate the necessity of carrying out the detection of the orientation and the detection of shifting speed of the image input apparatus, which are not stable in precision and reliability.

Figure 17:
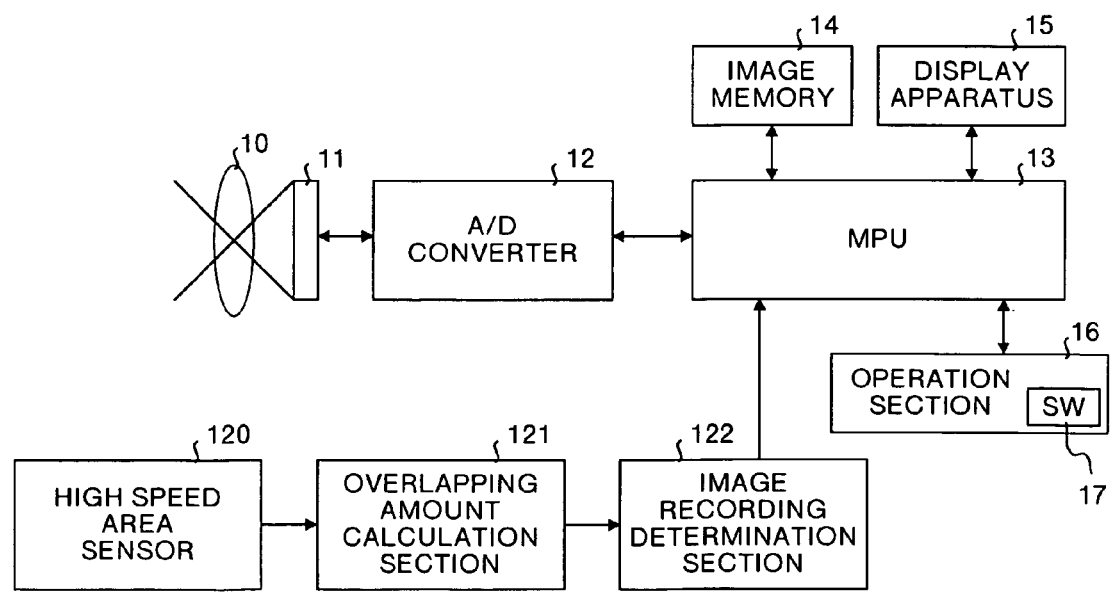
FIG. 17 is a block diagram that shows a construction of an image input apparatus in accordance with a seventh embodiment of the present invention.

FIG. 17 is a block diagram that shows the construction of an image input apparatus in accordance with the seventh embodiment of the present invention. In this Figure, reference number 120 represents a high speed area sensor that acquires an image virtually in the same area as the image pickup element 11 at high speeds, reference number 121 represents an overlapping amount calculation section for calculating the amount of overlap of the partial image that has been acquired by the high speed area sensor 120, and reference number 122 is an image recording determination section for determining whether or not the current partial image is recordable based upon the amount of overlap calculated by the overlapping amount calculation section 121. Here, the other constituent elements are the same as those shown in FIG. 1; therefore, the same reference numbers are used, and the description thereof is omitted.

In the above mentioned arrangement, first, the high speed area sensor 120 inputs an image within virtually the same area as the image pickup element 11. Then, the overlapping amount calculation section 121 calculates the amount of overlap between the input image to the high speed area sensor 120 at the time t when the partial image was previously acquired and an input image to the high speed area sensor 120 at the current time t+Δt.

Figure 18:
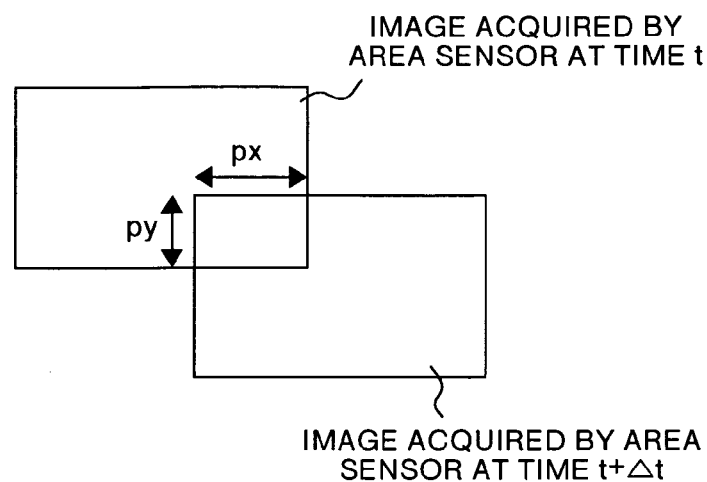
FIG. 18 is an explanatory drawing that shows an example of an acquired image by a high speed area sensor in accordance with the seventh embodiment of the present invention.

In the calculation method of the amount of overlap, a mutual correlation is found between the two images, and the size of the overlapping area between the two is found based upon positions at which the maximum values have been reached. For example, as illustrated in FIG. 18, when the calculation makes a judgment that the acquired image at the time t and the acquired image at the time t+Δt overlap each other, px, py are found. Then, these values are compared with predetermined threshold values tx, ty in the image recording determination section 122.

When the results of the comparison in the image recording determination section 122 satisfy the following inequality, an image recording signal is transmitted to MPU 13, and an image pickup operation of a partial image is carried out:

$$px < tx \text{ or } py < ty$$

When the partial image has been picked up, based upon the respective values of the line sensors 110, 111 at this position as a reference, px and py are again calculated by the overlapping amount calculation section 121 so as to newly pick up the next partial image adjacent thereto, and a judgment is made by the image recording determination section 122 as to whether or not the image recording is operable. Additionally, the above mentioned overlapping amount calculation section 121 and the image recording determination section 122 may be realized by software in the MPU 13.

In this manner, the high speed area sensor 120 that successively acquires an image being scanned is placed, and the amount of overlap of a partial image that is being currently scanned and is to be inputted by the image pickup element 11 of the image input apparatus with respect to at least one partial image that has been acquired by the high speed area sensor 120 so as to determine whether or not the current partial image is recordable; therefore, this arrangement makes it possible to eliminate the necessity of carrying out the detection of the orientation and the detection of shifting speed of the image input apparatus, which are not stable in precision and reliability. Moreover, the high speed area sensor 120, used for detecting the amount of overlap, is installed in a separated manner from the image pickup element 11 used for picking up divided images; thus, selective modes are achieved in which the normal image pickup element 11 is used for picking up divided images requiring high resolution, while, in contrast, the high speed area sensor 120 having high speeds although the number of pixels is small is used for acquiring images used for overlapping amount calculations that require high speed reading. Therefore, it is possible to achieve an apparatus that is more inexpensive and has higher performances, as compared with conventional apparatuses.

Figure 19:
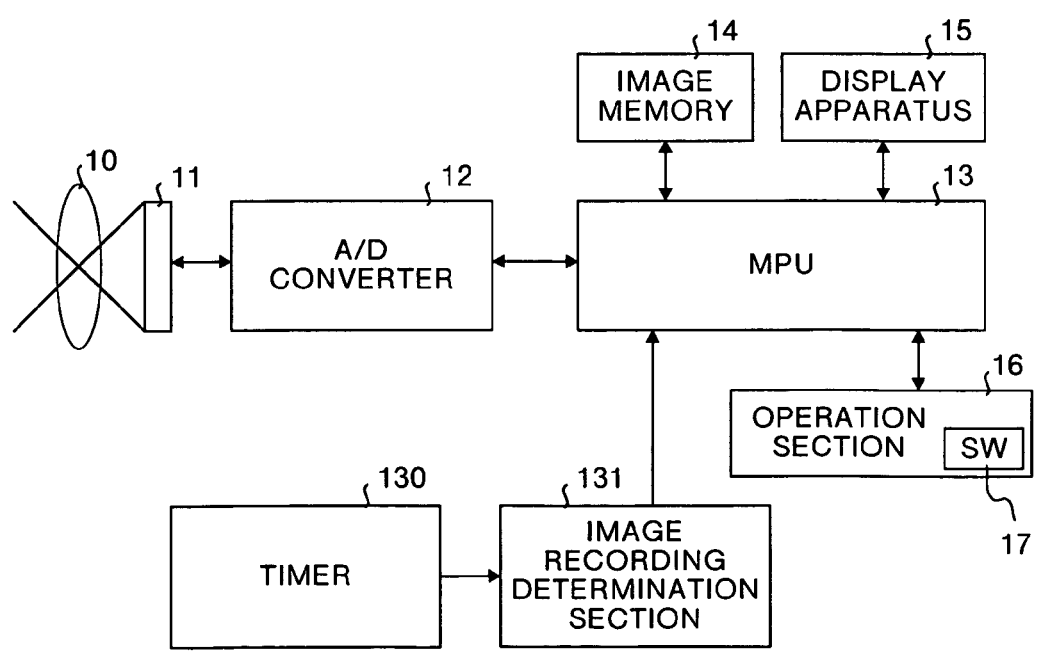
FIG. 19 is a block diagram that shows a construction of an image input apparatus in accordance with a eighth embodiment of the present invention.
Figure 20:
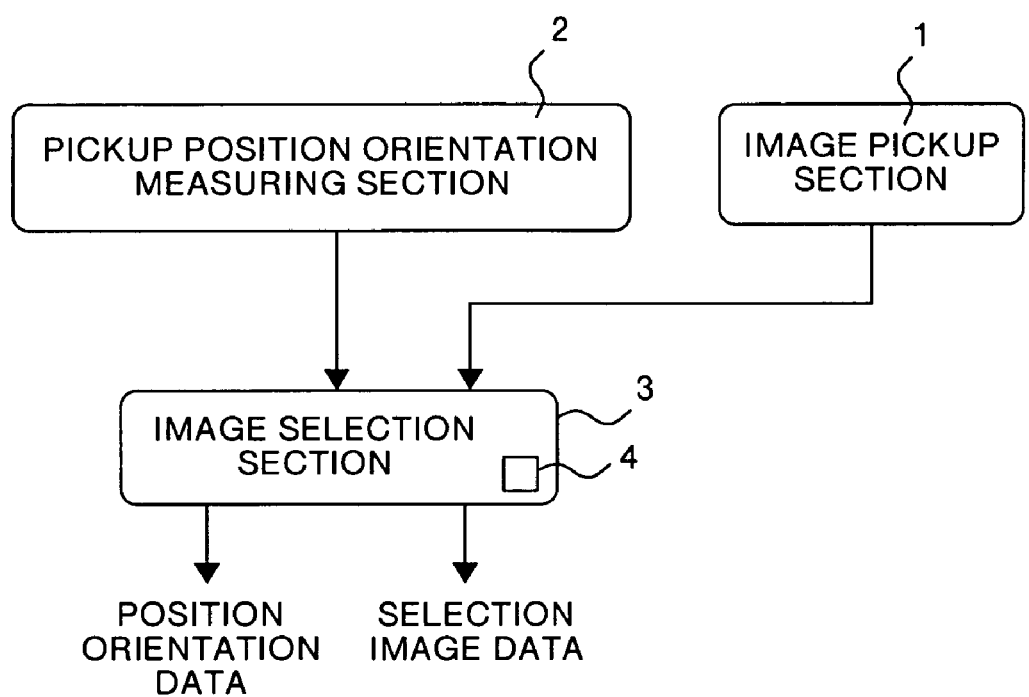
FIG. 20 is a block diagram that shows a construction of a conventional image input apparatus.

FIG. 19 is a block diagram that shows the construction of an image input apparatus in accordance with the eighth embodiment of the present invention. In this Figure, reference number 130 represents a timer that counts time from the image pickup time of the previous partial image, and reference number 131 is an image recording determination section for determining whether or not the current partial image is recordable based upon the counted time by the timer 130. Here, the other constituent elements are the same as those shown in FIG. 1; therefore, the same reference numbers are used, and the description thereof is omitted.

In the above mentioned arrangement, first, the timer 130 counts a period of time that has elapsed from the input time at which the previous partial image was acquired. Then, the counted time is compared with a predetermined threshold value in the image recording determination section 131. As a result of the comparison, when the counted time exceeds the predetermined threshold value, an image recording signal is transmitted to MPU 13, and an image pickup operation of a partial image is carried out. When the partial image has been picked up, the time counting is resumed after the timer 130 has been reset, and a judgment is made as to whether or not the image recording is operable. This operation may be added to any one of the image input apparatuses described in the aforementioned Embodiments 1 to 7. In this case, even when the input condition of the partial image in each of the Embodiments is not satisfied, the image acquiring may be carried out, when the counted time has exceeded the above mentioned threshold value. Here, the image recording determination section 131 may be realized by software in the MPU 13.

In this manner, the timer 130 for counting a period of elapsed time from the previous image input is installed, and when the elapsed time by the timer 130 has exceeded a predetermined value, the current partial image is acquired; therefore, this arrangement makes it possible to carry out input the partial image while maintaining the amount of overlap of the partial image so that it becomes possible to achieve a small size apparatus at low costs.

As described above, according to one aspect of the present invention, in the image input apparatus, when an image pickup unit is shifted so as to scan, at least direction components in parallel with the image pickup face are detected as relative positions before and after the shift, the amount of overlap between a partial image that was previously picked up and the partial image currently picked up is calculated by using the direction components, and when the result of the calculation is smaller than a predetermined value, the current partial image is recorded, while the amount of overlap is greater than the above mentioned value, it is not recorded. Therefore, it is possible to obtain a sufficient amount of overlap required at the time of image composition, and in comparison with a conventional arrangement in which positional orientation detections of 6 degrees of freedom are carried out on a subject, a simpler arrangement is achieved by detecting only information related to relative positions. As a result, it is possible to provide a small size image input apparatus at low costs.

According to another aspect of the present invention, in the image input apparatus, when an image pickup unit is shifted so as to scan, at least components around two axes that are virtually orthogonal to the light axis of the image pickup unit are detected as a change in angles after the shift, the amount of overlap between a partial image that was previously picked up and the partial image currently picked up is calculated by using the direction components, and when the result of the calculation is smaller than a predetermined value, the current partial image is recorded, while the amount of overlap is greater than the above mentioned value, it is not recorded. Therefore, even in the case of a great rotation by the user and in the service environments, it is possible to obtain a sufficient amount of overlap required at the time of image composition, and in comparison with a conventional arrangement in which positional orientation detections of 6 degrees of freedom are carried out on a subject, a simpler arrangement is achieved by detecting information of rotation angle of the image pickup unit. As a result, it is possible to provide a small size image input apparatus at low costs.

According to still another aspect of the present invention, in the image input apparatus, when an image pickup unit is shifted so as to scan, information of a change in angles or a relative position after the shift is obtained, the amount of overlap between a partial image that was previously picked up and the partial image currently picked up is calculated by using the direction components, and when the result of the calculation is smaller than a predetermined value, the current partial image is recorded, while the amount of overlap is greater than the above mentioned value, it is not recorded. Therefore, in the same manner as the third aspect of the present invention, even in the case of a great rotation by the user and in the service environments, it is possible to obtain a sufficient amount of overlap required at the time of image composition, and in comparison with a conventional arrangement in which positional orientation detections of 6 degrees of freedom are carried out on a subject, a simpler arrangement is achieved by detecting information of a change in angles or a relative position after the shift. As a result, it is possible to provide a small size image input apparatus at low costs.

Furthermore, a distance detection unit using a distance measuring sensor detects the distance between the subject and the image pickup unit, and the resulting detected value is added to parameters for calculating the amount of overlap in anyone of the first to third aspects of the present invention so that the amount of overlap of the partial images is calculated. Therefore, with respect to the apparatuses of the first to third aspects of the present invention, it is possible to obtain a sufficient amount of overlap required at the time of image composition more accurately, and it is also possible to provide a small size image input apparatus at low costs.

Furthermore, an inclination of the surface of subject is detected, and the resulting detected value is added to parameters for calculating the amount of overlap in any one of the first to fourth aspects of the present invention so that the amount of overlap of the partial images is calculated. Therefore, since the orientation information is also used, it becomes possible to obtain a sufficient amount of overlap required at the time of image composition more accurately, and it is also possible to provide a small size image input apparatus at low costs.

According to still another aspect of the present invention, in the image input apparatus, the amounts of shifts of the image pickup unit in the horizontal direction and the vertical direction are found by output values of line sensors placed at positions that are orthogonal to each other. Therefore, it is possible to eliminate the necessity of the orientation detection and the shift detection of the above mentioned aspects, and also to accurately carry out the detections of its orientation and position following the shift of the image pickup unit, from the viewpoint of precision and reliability.

According to still another aspect of the present invention, in the image input apparatus, a second image pickup unit, for example, a high speed area sensor, is installed. Therefore, it is possible to eliminate the necessity of the orientation detection and the shift detection, which are unstable in precision and reliability. Moreover, an image sensor (second image pickup unit) for picking up images used for calculating the amount of overlap is installed in a separate manner from the image sensor (first image pickup unit) for picking up partial images. Therefore, it is possible to achieve an apparatus having selectable modes at low costs, in which the first image pickup unit is used for images requiring high resolution while the second image pickup unit is used at the time of high speed image pickup processes.

Furthermore, a timer counts a period of elapsed time from the input time of the previous partial image, and based upon the resulting value, the amount of overlap is calculated so that, even when the respective sensors fail to properly detect due to any problem such as noise, the information from the counting unit can be used.

According to still another aspect of the present invention, in the image input apparatus, a timer for counting a period of elapsed time from the input time of the previous partial image is installed without a specific unit such as an orientation detection unit, etc., and partial images are inputted while maintaining an amount of overlap in accordance with the output value of the timer. Therefore, this arrangement eliminates the necessity of any specific detection unit, and makes it possible to achieve a small size image input apparatus at low costs.

Furthermore, the image input apparatus stops to pick up an image when the image input apparatus has an amount of shift not less than a predetermined amount of shift. Therefore, it is possible to avoid picking up blurring images (unnecessary images) that tend to occur when the amount of shift is great.

The present document incorporates by reference the entire contents of Japanese priority document, 2000-200198 filed in Japan on Jun. 30, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image input apparatus comprising:
a first image pickup unit configured to optically scan a subject and thereby to acquire an image of the subject;
a recording unit configured to record a series of overlapped partial images selectively acquired by the first image pickup unit;
a second image pickup unit configured to continuously pick up a secondary image of the subject that corresponds with a portion of the subject being scanned by the first pickup unit;
an overlapping amount calculating unit configured to calculate an amount of overlap between images corresponding to potentially recordable partial images being acquired by said first image pickup unit based upon the secondary image picked up by said second image pickup unit;
an image recording determination unit configured to output a recording indicating signal when a current image obtainable from the first image pickup unit is to be recorded as one of the series of overlapped partial images based upon an amount of overlap calculated by the overlapping amount calculating unit; and
a control unit configured to be responsive to the recording indicating signal to automatically cause the recording unit of the current image obtainable from the first image pickup unit recording unit.

2. The image input apparatus according to claim 1, wherein said image recording determination unit is further configured to stop the recording of the partial images when an amount of shift of said first image pickup unit is greater than a desired value.

3. The image input apparatus according to claim 1, further comprising an image composing unit configured to compose all or a portion of the recorded series of overlapped partial images of the subject to obtain a single image.

4. The image input apparatus according to claim 1, wherein the first image pickup unit and the second image pickup unit acquire images from substantially same areas.

5. The image input apparatus according to claim 1, wherein the resolution of the secondary images acquired by the second image pickup unit is lower than the resolution of the images acquired by the first image pickup unit.

6. An image input apparatus comprising:
a first image pickup unit configured to optically scan a subject and thereby to acquire an image of the subject;
a recording unit configured to record a series of overlapped partial images selectively acquired by the first image pickup unit;
a second image pickup unit configured to continuously pick up a secondary image of the subject that corresponds with a portion of the subject being scanned by the first pickup unit;
an overlapping amount calculating unit configured to calculate an amount of overlap between images corresponding to potentially recordable partial images being acquired by said first image pickup unit based upon the secondary image picked up by said second image pickup unit;
a timer configured to count time that has elapsed from when a previous partial image was acquired;
an image recording determination unit configured to output a recording indicating signal when a current image obtainable from the first image pickup unit is to be recorded as one of the series of overlapped partial images based on information including an amount of overlap calculated by the overlapping amount calculating unit and the time counted by said timer; and a control unit configured to be responsive to the recording indicating signal to automatically cause the recording unit of the current image obtainable from the first image pickup unit recording unit.

7. The image input apparatus according to claim 6, wherein the first image pickup unit and the second image pickup unit acquire images from substantially same areas.

8. The image input apparatus according to claim 6, wherein the resolution of the secondary image acquired by the second image pickup unit is lower than the resolution of the images acquired by the first image pickup unit.

9. An image input apparatus comprising:

a first optical scanning and pickup means for optically scanning a subject to thereby acquire an image of the subject;

a recording means for recording a series of overlapped partial images selectively acquired by the first optical scanning and pickup means;

a second optical scanning and pickup means for scanning and continuously picking up a secondary image of the subject that corresponds with a portion of the subject being scanned by the first optical scanning and pickup means;

an overlapping amount calculating means for calculating an amount of overlap between images corresponding to potentially recordable partial images picked up by said first optical scanning and pickup means based upon the secondary image picked up by said second optical scanning and pickup means;

an image recording determination means for outputting a recording indicating signal when a current image obtainable from the first optical scanning and pickup means is to be recorded as one of the series of overlapped partial images based upon an amount of overlap calculated by the overlapping amount calculating means; and a control means responsive to the recording indicating signal for automatically causing the recording by the recording means of the current image obtainable from the first optical scanning and pickup means.

10. The image input apparatus according to claim 9, wherein said image recording determination means stops the recording of the partial images when an amount of shift of said first optical scanning and pickup means is determined to be greater than a desired value.

11. The image input apparatus according to claim 9, further comprising an image composing means for composing all or a portion of the recorded series of overlapped partial images of the subject to obtain a single image.

12. The image input apparatus according to claim 9, wherein the first optical scanning and pickup means and the second optical scanning and pickup means acquire images from substantially same areas.

13. The image input apparatus according to claim 9, wherein the resolution of the secondary image acquired by the second optical scanning and pickup means is lower than the resolution of the images acquired by the first optical scanning and pickup means.

14. An image input apparatus comprising:

a first optical scanning and image pickup means for optically scanning a subject to thereby acquire an image of the subject from the first optical scanning and image pickup means;

a recording means for recording a series of overlapped partial images selectively acquired by the first optical scanning and pickup means;

a second optical scanning and pickup means for scanning and continuously picking up a secondary image of the subject that corresponds with a portion of the subject being scanned by the first optical scanning and pickup means;

an overlapping amount calculating means for calculating an amount of overlap between images corresponding to potentially recordable partial images picked up by said first optical scanning and pickup means based upon the secondary image picked up by said second optical scanning and pickup means;

a timer means for counting time that has elapsed from when a previous partial image was acquired;

an image recording determination means for outputting a recording indicating signal when a current image obtainable from the first optical scanning and pickup means can be recorded as one of the series of overlapped partial images based on information including the amount of overlap calculated by the overlapping amount calculating means and the time counted by said timer means; and a control means responsive to the recording indicating signal for automatically causing the recording by the recording means of the current image obtainable from the first optical scanning and pickup means.

15. The image input apparatus according to claim 14, wherein the first optical scanning and pickup means and the second optical scanning and pickup means acquire images from substantially same areas.

16. The image input apparatus according to claim 14, wherein the resolution of the secondary image acquired by the second optical scanning and pickup means is lower than the resolution of the images acquired by the first optical scanning and pickup means.

17. An image inputting method comprising steps of:

optically scanning a subject with a first optical scanning and pickup unit by moving the first optical scanning and pickup unit in a plane that is parallel to a plane of the subject without touching the subject to acquire plural partial images of the subject from the first optical scanning and pickup unit;

scanning and continuously picking up an image of the subject with a second optical scanning and pickup unit;

calculating an amount of overlap based upon the partial image picked up by said first optical scanning and pickup unit and the image picked up by said second optical scanning and pickup unit, wherein the calculated amount of overlap is the amount of overlap between the partial image picked up by said first optical scanning and pickup unit and the image picked up by said second optical scanning and pickup unit;

determining whether or not a current partial image is to be recorded based upon the amount of overlap calculated in the calculating step; and automatically performing recording responsive to the determining step determining that a current partial image is to be recorded.

18. The image inputting method according to claim 17, further comprising a step of determining that an amount of shift of said first optical scanning and pickup unit is greater than a desired value and stopping the further acquiring of the partial images.

19. The image input method according to claim 17, further comprising a step of composing all or a portion of the partial images of the subject to obtain a single image.

20. An image inputting method comprising steps of:
- optically scanning a subject with a first optical scanning and pickup unit by moving the first optical scanning and pickup unit in a plane that is parallel to a plane of the subject without touching the subject to acquire plural partial images of the subject from the first optical scanning and pickup unit;
- scanning and continuously picking up an image of the subject with a second optical scanning and pickup unit;
- calculating an amount of overlap between the partial images picked up by said first optical scanning and pickup unit based upon the image picked up by said second optical scanning and pickup unit;
- counting time that has elapsed from when a previous partial image was acquired; and
- determining whether or not a current partial image being scanned by the first optical scanning and pickup unit can be recorded based on information including the amount of overlap calculated in the calculating an amount of overlap step and the time counted by the counting time step.

* * * * *

UNITED STATES PATENT AND TRADEMARK OFFICE
CERTIFICATE OF CORRECTION

PATENT NO. : 7,145,596 B2  Page 1 of 1
APPLICATION NO. : 09/893784
DATED : December 5, 2006
INVENTOR(S) : Takashi Kitaguchi et al.

It is certified that error appears in the above-identified patent and that said Letters Patent is hereby corrected as shown below:

Column 20, line 14, please change "the first pickup unit" to --the first image pickup unit--;

line 30, please delete "recording unit";

line 56, please change "the first pickup unit" to --the first image pickup unit--.

Signed and Sealed this

Eighth Day of May, 2007

JON W. DUDAS
*Director of the United States Patent and Trademark Office*